United States Patent
Müller et al.

(10) Patent No.: US 9,637,609 B2
(45) Date of Patent: May 2, 2017

(54) PROCESS FOR THE PRODUCTION OF A COMPOSITE POLYMER MATERIAL WITH INCREASED FILLER CONTENT

(71) Applicant: Omya International AG, Oftringen (CH)

(72) Inventors: Holger Müller, Rheinfelden (DE); Jürgen Leonhardt, Oftringen (CH); Jürgen Spehn, Safenwil (CH); Eduard Michel, Schliengen (DE)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/772,915

(22) PCT Filed: Apr. 3, 2014

(86) PCT No.: PCT/EP2014/056729
§ 371 (c)(1),
(2) Date: Sep. 4, 2015

(87) PCT Pub. No.: WO2014/161956
PCT Pub. Date: Oct. 9, 2014

(65) Prior Publication Data
US 2016/0017113 A1 Jan. 21, 2016

Related U.S. Application Data

(60) Provisional application No. 61/817,439, filed on Apr. 30, 2013.

(30) Foreign Application Priority Data

Apr. 5, 2013 (EP) .................................... 13162601

(51) Int. Cl.
| C08K 3/26 | (2006.01) |
| B29B 7/90 | (2006.01) |
| C08J 3/20 | (2006.01) |
| C08J 3/22 | (2006.01) |
| B29C 47/10 | (2006.01) |
| B29B 7/46 | (2006.01) |
| B29B 9/06 | (2006.01) |

(52) U.S. Cl.
CPC .................. *C08K 3/26* (2013.01); *B29B 7/90* (2013.01); *B29C 47/10* (2013.01); *C08J 3/203* (2013.01); *C08J 3/226* (2013.01); *B29B 7/46* (2013.01); *B29B 9/06* (2013.01); *B29C 2947/922* (2013.01); *B29C 2947/92514* (2013.01); *B29C 2947/92704* (2013.01); *B29C 2947/92895* (2013.01); *C08J 2327/06* (2013.01); *C08K 2003/265* (2013.01)

(58) Field of Classification Search
CPC ............................ C08K 3/26; C08K 2003/265
See application file for complete search history.

(56) References Cited

U.S. PATENT DOCUMENTS

| 5,589,531 A * | 12/1996 | Menashi .................. C08K 3/22 524/409 |
| 6,953,815 B2 | 10/2005 | Enomoto et al. |
| 2003/0144423 A1 | 7/2003 | Marchand et al. |

FOREIGN PATENT DOCUMENTS

| DE | 102006024724 A1 | 1/2007 |
| EP | 1217042 A1 | 6/2002 |
| EP | 1584650 A1 | 10/2005 |
| EP | 1745907 A2 | 1/2007 |
| EP | 2371766 A1 | 10/2011 |
| EP | 2447213 A1 | 5/2012 |
| EP | 2524898 A1 | 11/2012 |
| IE | 930545 | 1/1995 |
| WO | 0039211 A2 | 7/2000 |
| WO | 03004236 A1 | 1/2003 |
| WO | 03020801 A1 | 3/2003 |
| WO | 2010049530 A2 | 5/2010 |
| WO | 2013048775 A1 | 4/2013 |

OTHER PUBLICATIONS

International Search Report dated Jun. 4, 2014 for PCT Application No. PCT/EP2014/056729.
Written Opinion of the International Searching Authority dated Jun. 4, 2014 for PCT Application No. PCT/EP2014/056729.
Reisenhofer "Präzise für hochgefüllte Rezepturen." Kunststoffe, vol. 95, No. 10, 2005, pp. 232-234.

\* cited by examiner

*Primary Examiner* — Robert Harlan

(74) *Attorney, Agent, or Firm* — Amster, Rothstein & Ebenstein LLP

(57) ABSTRACT

An inventive process for the production of a composite polymer material is provided allowing for the preparation of a composite polymer material with high filler content which may be used as a masterbatch.

11 Claims, No Drawings

PROCESS FOR THE PRODUCTION OF A COMPOSITE POLYMER MATERIAL WITH INCREASED FILLER CONTENT

CROSS-REFERENCE TO RELATED APPLICATIONS

This is a U.S. national phase of PCT Application No. PCT/EP2014/056729, filed Apr. 3, 2014, which claims priority to European Application No. 13162601.2, filed Apr. 5, 2013 and U.S. Provisional Application No. 61/817,439, filed Apr. 30, 2013.

The present invention relates to a process for the production of a composite polymer material with increased filler content and to the use of said composite polymer material.

Increasing costs for the production of polymers are driving development of methods for the provision of higher levels of fillers in composite polymer materials. Said fillers are frequently selected from natural or synthetic minerals such as calcium carbonate, chalk, limestone, marble, dolomite, titanium dioxide, barium sulphate, talc, clay, or mica.

In a conventional process for the production of a composite polymer material a polymer material and a filler material may be mixed in a hot-cold mixer to form a polymer dry-blend. The polymer dry-blend then is usually conveyed pneumatically to a compounder, typically an extruder, in which the composite polymer material is formed.

Composite polymer materials with increased filler content and methods for the production of the said composite polymer materials are known from the prior art.

EP 1 584 650 A1 discloses a masterbatch pellet comprising a thermoplastic resin and 2 to 60% by weight of a white combustion catalyst blended in the thermoplastic resin. The masterbatch pellets are suitable for producing a thermoplastic resin composition exhibiting a combustion-promoting effect.

IE 930545 discloses the use of a masterbatch material which may be added to a recycle line of oversize material of an extruding device.

EP 1 421 136 B1 discloses a method for the production of a masterbatch carrier, which method includes blending of at least one chlorinated polyolefin, at least one acrylic processing aid, at least one acrylic impact modifier and forming the blend into a shaped body. In particular, the method is directed towards a method for the provision of a masterbatch suitable for use in colouring of polyvinyl chloride. Said masterbatch may further include a filler.

US 2003/0144423 A1 is directed to polyvinyl chloride compositions having improved impact strength. The composition may comprise a vinyl chloride polymer, at least one ethylene/alpha-olefin copolymer and at least one randomly chlorinated olefin polymer. Optionally, the compositions may have inorganic filler levels from 5 to 50 phr.

WO 2010/049530 A2 relates to profiles made from foamed polyvinyl chloride comprising at least 40 phr, preferably at least 60 phr of naturally occurring mineral filler, and polyvinyl chloride with a k-value of 50 to 58. The filler preferably is talc and/or mica and more preferably is talc. The document further discloses a method according to which two steps, a first and a second mixing step, are used in order to reduce problems like segregation and quality loss. Major part of the filler is added in said second mixing step which is carried out at a temperature higher than 180° C.

According to H. Müller in *Kunststoffe International* 12/2006, 62-66, a calcium carbonate containing polyvinyl chloride is disclosed, wherein said calcium carbonate is added to a polyvinyl chloride dry-blend directly prior to an extruder by means of direct addition technology. According to said method 5 to 50 phr calcium carbonate may be added.

However, conventional methods known in the art for the production of composite polymer materials have several disadvantages when applied in the production of composite polymer materials with increased filler content. Typically, problems in conventional methods for the production of composite polymer materials begin to arise at filler contents above 20 to 30 phr.

For example, addition of increased amounts of filler material, i.e. amounts above 20 to 30 phr, to a polymer when applying conventional methods leads to increased mixing times.

Another disadvantage when applying conventional methods in the production of composite polymer materials with increased filler content is the formation of filler material deposits on the walls of the hot-cold mixer.

Yet another disadvantage when applying conventional methods in the production of composite polymer materials with increased filler content is the segregation of polymer material and filler material in the dry-blend when pneumatically conveying the dry-blend obtained from the hot-cold mixing to the compounder. This in turn results in non-uniform filler contents of the produced composite polymer material.

In view of the foregoing, improving the process for the provision of composite polymer materials with increased filler content remains of interest for the skilled person.

It is therefore an object to provide a process according to which costly and energy-intensive mixing times may be reduced. The consumption of electrical energy, e.g. during the hot-cold mixing, may be reduced due to the fact that the mineral filler material introduced via direct addition technology does not necessarily require a heating step and a subsequent cooling step.

It is a further object to provide a process according to which the formation of filler material deposits in the hot-cold mixer may be avoided.

It is a further object to provide a process according to which segregation problems when pneumatically conveying the dry-blend obtained from the hot-cold mixer to the compounder may be avoided.

It is yet a further object to provide a composite polymer material with increased filler content which may be incorporated into polymer products and thereby increasing the filler content of said polymer product.

It would also be desirable to provide a composite polymer material that allows adapting the filler content of a polymer product to a predetermined value and moreover may be dosed precisely and uniformly.

The foregoing and other objects are solved by the subject-matter as defined herein in the independent claims.

According to one aspect of the present invention a process for the production of a composite polymer material is provided, comprising the steps of:
 (a) providing a mineral filler material;
 (b) providing a polymer material;
 (c) conveying the mineral filler material of step (a) and the polymer material of step (b) to a compounder;
 (d) forming a composite polymer material in said compounder;
wherein the mineral filler material of step (a) is added to the polymer material of step (b) in an amount so that the mineral filler content of the resulting composite polymer material is in the range from 60 to 900 phr and wherein said addition is performed by use of direct addition technology.

According to another aspect the present invention relates to the provision of a composite polymer material obtainable by the inventive process.

According to yet another aspect of the present invention, a composite polymer material is provided comprising a mineral filler material and a polymer material, wherein the composite polymer material is in the form of grains having an average grain size of less than 4 mm, preferably less than 3 mm and most preferably less than 2 mm, and wherein the filler content in the composite polymer material is in the range from 60 to 900 phr.

According to yet another aspect of the present invention a polymer product comprising the inventive composite polymer material is provided.

Another aspect of the present invention relates to the use of the inventive composite polymer material in polymer products wherein the composite material is preferably used as a masterbatch.

Advantageous embodiments of the inventive process are defined in the corresponding subclaims.

According to one embodiment of the inventive process the mineral filler content of the resulting composite polymer material is in the range from 150 to 800 phr, preferably in the range from 160 to 700 phr and more preferably in the range from 170 to 600 phr.

According to another embodiment of the inventive process the composite polymer material in step (d) is produced in form of a granulate having an average grain size ranging from 2 to 8 mm, preferably from 3 to 7 mm and more preferably from 4 to 6 mm.

According to still another embodiment of the inventive process the obtained composite polymer material is micronized to yield an average grain size of less than 4 mm, preferably less than 3 mm and most preferably less than 2 mm.

According to another embodiment of the inventive process the polymer material provided in step (b) comprises a mineral filler material, wherein the content of the mineral filler material in the polymer material preferably is in the range from 1 to 70 phr, preferably from 5 to 60 phr and more preferably from 10 to 50 phr.

According to another embodiment of the inventive process the polymer material provided in step (b) comprises a recycled polymer material, wherein the recycled polymer material preferably comprises a micronized recycled polymer material.

According to another embodiment of the inventive process said compounder is an extruder, wherein the temperature of the polymer melt preferably is kept below 205° C.

According to another embodiment of the inventive process the mineral filler material is selected from the group consisting of calcium carbonate, chalk, limestone, marble, dolomite, titanium dioxide, barium sulphate, talc, clay, or mica, and mixtures thereof, wherein the mineral filler material preferably is calcium carbonate and/or dolomite.

According to a preferred embodiment of the inventive process the mineral filler material is selected from ground dolomite, ground calcium carbonate (GCC), precipitated calcium carbonate (PCC), modified calcium carbonate (MCC), or mixtures thereof.

According to still another embodiment of the inventive process the polymer material comprises a polymer selected from the group consisting of vinyl polymers, vinyl copolymers, acryl polymers, acryl copolymers, chlorinated polyethylenes, and mixtures thereof, wherein the polymer material preferably comprises vinyl polymers and/or vinyl copolymers, and more preferably is a polyvinyl chloride.

According to another embodiment of the inventive composite polymer material the mineral filler content of the composite polymer material is in the range from 150 to 800 phr, preferably in the range from 160 to 700 phr and more preferably in the range from 170 to 600 phr.

According to still another embodiment of the inventive composite polymer material the mineral filler material is selected from the group consisting of calcium carbonate, chalk, limestone, marble, dolomite, titanium dioxide, barium sulphate, talc, clay, or mica, and mixtures thereof, wherein the mineral filler material preferably is calcium carbonate and/or dolomite.

According to another embodiment of the inventive composite polymer material the polymer material comprises a polymer being selected from the group consisting of vinyl polymers, vinyl copolymers, acryl polymers, acryl copolymers, chlorinated polyethylenes, and mixtures thereof, wherein the polymer material preferably comprises vinyl polymers and/or vinyl copolymers, and more preferably comprises a polyvinyl chloride.

According to another embodiment of the inventive composite polymer material the k-value of the polymer material is in the range from 30 to 100, preferably from 45 to 70 and most preferably from 50 to 68, wherein the polymer material preferably is a polyvinyl chloride.

According to a preferred embodiment the polymer product is a granulate, window profile, pipe, technical profile, wall panel, ceiling panel, cladding panel, wire or cable insulation, film, sheet, fibre, or a non-woven.

It should be understood that for the purposes of the present invention, the following terms have the following meanings:

The term "mineral filler material" in the meaning of the present invention refers to substances of mineral origin, which may be added to materials such as paper, polymers, rubber, paints or adhesives, e.g. to lower the consumption of more expensive materials and/or to enhance technical properties of the products. The person skilled in the art very well knows the typical fillers used in the respective fields.

The term "mineral" as used herein encompasses abiogenic and solid material with an ordered atomic structure.

A "polymer material" as used in this application comprises homopolymers, copolymers such as, for example, block, graft, random and alternating copolymers, heterophasic copolymers and random heterophasic copolymers as well as polymer blends, modifications and mixtures thereof. The term polymer material as used herein may likewise comprise recycled polymer materials, e.g. recycled polyvinyl chloride. The content of recycled polymer material in the polymer material may be in the range from 0.1 to 100 wt.-%.

A "composite polymer material" as used in this application is a material comprising at least one polymer and at least one mineral filler material.

The "compounder" according to the present application may be any device which is suitable for compounding of one or more polymer material with one or more additive, e.g. a mineral filler material. Said compounder comprises a compounding section, in which the mineral filler material and the polymer material are actually compounded. Such devices are known in the art.

The term "direct addition technology" as used herein comprises the addition and mixing of a mineral filler material to a polymer material in a direct addition device upstream from a compounding section of a compounder, wherein the direct addition device is in direct connection to the compounding section of the compounder and preferably above said compounding section of the compounder, so that no pneumatic conveying of the resulting mixture to the compounding section is involved.

The term "granulate" as used in this application refers to a product obtained by a granulation process. The granulate may have a defined shape such as, for example, pellets, spheres, pearls, prills, flakes, chips or slugs, a non-defined shape such as, for example, crumbles, or it may be a mixture of both defined and non-defined shape composite polymer materials. Granulation may be carried out, e.g. with a compounder as defined above, by pressing a polymer melt through a die equipped with a cutting knife, wherein the granule size may be regulated by the applied pressure and/or the cutting speed. However, any other system that is suitable to produce granulates may be used.

The term "micronization" refers to methods for the size reduction of granulates. Such methods for the reduction of the average grain size include, without being limited to, milling, bashing and grinding as well as methods involving supercritical fluids. A micronized granulate may have an average grain size in the range from 100 to 4000 μm.

The "average grain size" of the composite polymer material is the weight median grain size, i.e. 50 wt.-% of all grains are bigger or smaller than this average grain size. The grain size is determined by sieving according to ISO 3310-1:2000 (E).

The unit "phr" (parts per hundred resins) as used herein refers to the parts by dry weight of an ingredient per hundred parts by dry weight of a reference polymer.

The "k-value" is a measure of the molecular weight of a polymer, e.g. of a polyvinyl chloride, based on measurements of viscosity of a polymer solution. It ranges usually from 30 to 100. Low k-values imply low molecular weight (which is easy to process but has inferior properties) and high k-values imply high molecular weight (which is difficult to process, but has outstanding properties).

The term "masterbatch" refers to a polymer composite material which is used in the production of a polymer product. A masterbatch may be added, e.g. prior to extrusion, to a polymer product in order to achieve e.g. higher filler contents when using a mineral filler masterbatch.

"Ground calcium carbonate" (GCC) in the meaning of the present invention is a calcium carbonate obtained from natural sources, such as limestone, marble, calcite, or chalk, and processed through a wet and/or dry treatment such as grinding, screening and/or fractionation, for example by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2 524 898 A1, EP 2 371 766 A1, or unpublished European patent application No. 12 164 041.1.

"Modified calcium carbonate" (MCC) in the meaning of the present invention may feature a natural ground or precipitated calcium carbonate with an internal structure modification or a surface-reaction product, i.e. surface-reacted calcium carbonate.

Throughout the present document, the "particle size" of the filler material is described by its distribution of particle sizes. The value $d_x$ represents the diameter relative to which x % by weight of the particles have diameters less than $d_x$.

This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all particles are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

Where an indefinite or definite article is used when referring to a singular noun, e.g. "a", "an" or "the", this includes a plural of that noun unless something else is specifically stated.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

According to the present invention, the process for the production of a composite polymer material comprises the steps of:
  (a) providing a mineral filler material;
  (b) providing a polymer material;
  (c) conveying the mineral filler material of step (a) and the polymer material of step (b) to a compounder;
  (d) forming a composite polymer material in said compounder;
wherein the mineral filler material of step (a) is added to the polymer material of step (b) in an amount so that the mineral filler content of the resulting composite polymer material is in the range from 60 to 900 phr and wherein said addition is performed by use of direct addition technology.

In the following preferred embodiments of the inventive process for the production of a composite polymer material will be set out in more detail. It is to be understood that these technical details and embodiments also apply to the inventive composite polymer material and the use of said inventive composite polymer material.

As set out above, the inventive process for the production of a composite polymer material comprises the steps (a), (b), (c) and (d). In the following, it is referred to further details of the present invention and in particular to the foregoing steps of the inventive process.

Characterization of Step (a):

According to step (a) of the process of the present invention, a mineral filler material is provided.

A mineral filler material in the meaning of the present invention refers to a substance of mineral origin which can be added to materials such plastics to lower the consumption of more expensive materials such as binders, or to enhance technical properties of the products. The person skilled in the art very well knows the typical fillers used in the respective fields. Mineral fillers as described herein may encompass natural or synthetic minerals such as calcium carbonate, chalk, limestone, marble, dolomite, titanium dioxide, barium sulphate, talc, clay, or mica, and mixtures thereof, wherein the mineral filler material preferably is calcium carbonate and/or dolomite.

The mineral filler material according to the present invention may have a median particle size $d_{50}$ in the range from 0.001 µm to 100 µm, preferably from 0.5 to 5 µm.

According to one embodiment of the inventive process the mineral filler material is selected from ground calcium carbonate, precipitated calcium carbonate, surface modified calcium carbonate, dolomite, or mixtures thereof.

Ground calcium carbonate (GCC) in the meaning of the present invention is a calcium carbonate obtained from natural sources which may be processed by, for example, grinding, screening and/or fractionizing by wet and/or dry, for example by a cyclone or classifier. Preferably, the natural calcium carbonate is selected from the group consisting of chalk, limestone, marble, or mixtures thereof.

Natural or ground calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable.

Precipitated calcium carbonate (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite.

Precipitated calcium carbonate (PCC) synthesis most commonly occurs by a synthetic precipitation reaction that includes a step of contacting carbon dioxide with a solution of calcium hydroxide, the latter being most often provided on forming an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material. When referred to in the context of the present invention, PCC shall be understood to mean synthetic calcium carbonate products obtained by carbonation of a slurry of calcium hydroxide, commonly referred to in the art as a slurry of lime or milk of lime when derived from finely divided calcium oxide particles in water. Preferred synthetic calcium carbonate is precipitated calcium carbonate comprising aragonitic, vateritic or calcitic mineralogical crystal forms or mixtures thereof.

Modified calcium carbonate (MCC) in the meaning of the present invention may feature a natural ground or precipitated calcium carbonate with an internal structure modification or a surface-reaction product, i.e. surface-reacted calcium carbonate.

The term PCC likewise comprises PCC having a particle size in the nanometer range which is also referred to as ultrafine PCC or nano-PCC. More precisely, the term nano-PCC as used herein refers to PCC having a weight median particle size $d_{50}$ in the range from 1 to about 70 nm, whereas ultrafine PCC refers to PCC having a weight median particle size $d_{50}$ in the range from 70 to 1000 nm.

According to a preferred embodiment of the present invention the calcium carbonate is a surface-treated or coated calcium carbonate, i.e. a ground, precipitated or modified calcium carbonate comprising a treatment or coating e.g. with fatty acids, surfactants, siloxanes, polymers, or mixtures thereof.

According to another embodiment of the present invention the filler material is ground dolomite.

Characterization of Step (b):

According to step (b) of the process of the present invention a polymer material is provided.

A polymer material as used in this application may comprise homopolymers, copolymers such as, for example, block, graft, random and alternating copolymers, heterophasic copolymers and random heterophasic copolymers as well as polymer blends, modifications, and mixtures thereof. The polymer material as used herein optionally may contain one or more additives which are well known to the skilled person.

Such additives comprise, without being limited to, mineral fillers, fibres, lubricants, plasticizers, stabilizers (e. g. heat stabilizers or UV stabilizers), co-stabilizers, one packs, processing aids, impact modifiers, flame retardants, antioxidants, biocides, blowing agents, and smoke suppressors. Such additives can be present in amounts up to 100 phr, preferably in an amount from 0.1 to 10 phr.

In the art and in particular in the field of polyvinyl chloride mixtures comprising stabilizers and lubricants are available, also referred to as one packs. Typical stabilizers may comprise lead stabilizers, calcium-zink stabilizers, organic based stabilizers, calcium organic based stabilizers or tin stabilizers. Typical lubricants may comprise internal lubricants such as fatty alcohols, dicarboxylic acid esters or oxidized polyethylene waxes, external lubricants such as paraffin wax or polyethylene wax or lubricants with internal and external properties such as ester wax or fatty acid esters.

The polymer material may be a neat or virgin polymer material or may contain a mineral filler material which may be selected from the embodiments as defined above for step (a). However, any other suitable mineral filler material may be used.

According to one embodiment the mineral filler material present in the polymer material provided in step (b) is identical to the mineral filler mineral material provided in step (a).

According to another embodiment the mineral filler material present in the polymer material provided in step (b) is different from the mineral filler material provided in step (a).

According to another embodiment the mineral filler material that is present in the polymer material provided in step (b) is different from the mineral filler which is already present in the polymer material as provided in step (a).

According to one embodiment of the inventive process the polymer material provided in step (b) comprises a mineral filler material, wherein the content of the mineral filler material in the polymer material preferably is in the range from 1 to 70 phr, preferably from 5 to 60 phr and more preferably from 10 to 50 phr.

The polymer material provided in step (b) may be produced in a hot-cold mixer according to which the mineral filler material and/or additives as defined above may be added to a polymer material. In a first step of the hot-cold mixing a polymer material may be mixed with one or more of said mineral filler material and/or additives in a hot-mixer until, for example, a temperature of 120° C. is reached. In a second step, the mixture then may be cooled, for example, to about 50° C. in a cold-mixer.

According to another embodiment of the inventive process the polymer material may comprise recycled polymer material, wherein the recycled polymer material preferably comprises a micronized recycled polymer material. The micronized recycled polymer material may have an average grain size in the range from 1 to 4000 μm. The content of recycled polymer material in the polymer material may be in range from 0.1 to 100 wt.-%.

According to another embodiment the polymer material comprises a recycled polyvinyl chloride (R-PVC) and preferably a micronized recycled polyvinyl chloride.

According to yet another embodiment of the inventive process the polymer material comprises a polymer selected from the group consisting of vinyl polymers, vinyl copolymers, acryl polymers, acryl copolymers, chlorinated polyethylenes, and mixtures thereof, wherein the polymer material preferably comprises vinyl polymers and/or vinyl copolymers. For example, a vinyl polymer or vinyl copolymer may be a polyvinyl chloride, a polyvinyl acetate, a polyvinyl alcohol, a polyvinyl pyrrolidone, or a ethylene-vinyl acetate. An acryl polymer or acryl copolymer, for example, may be a polyacryl acid, a polyacryl ester, a polyacrylonitrile, or a acrylic styrene acrylonitrile.

According to a preferred embodiment of the inventive process the polymer material comprises a polyvinyl chloride.

According to another embodiment of the inventive process the polymer material comprises suspension polyvinyl chloride (S-PVC), mass polyvinyl chloride (M-PVC), or emulsion polyvinyl chloride (E-PVC).

According to another embodiment the k-value of the polymer material is in the range from 30 to 100, preferably from 45 to 70 and most preferably from 50 to 68, wherein the polymer material preferably is a polyvinyl chloride. The k-value is a measure of the molecular weight of a polymer. For example, k-values of polyvinyl chloride may range from 30 to 100. K-values of polyvinyl pyrrolidone may range from 10 to 120. Low k-values imply low molecular weight (which is easy to process but has inferior properties) and high k-values imply high molecular weight, (which is difficult to process, but has outstanding properties).

Characterization of Step (c):

According to step (c) of the process of the present invention the mineral filler material of step (a) and the polymer material of step (b) are conveyed to a compounder.

The feeding of the mixture of the mineral filler material of step (a) and the polymer material of step (b) to the compounding section of the compounder may be carried out by use of a conveying screw, preferably a co-rotating double screw, which may additionally be combined with a stuffing device.

Characterization of Step (d):

According to step (d) of the process of the present invention a composite polymer material is formed in the compounder, wherein the mineral filler material of step (a) is added to the polymer material of step (b) in an amount so that the mineral filler content of the resulting composite polymer material is in the range from 60 to 900 phr and wherein said addition of the mineral filler material to the polymer material is performed by use of direct addition technology.

The compounder used according to the inventive process can be any device which is suitable for compounding the polymer material with the mineral filler. Such devices are known in the art.

According to one embodiment, the compounder is an extruder or a co-kneader, e.g. a twin screw extruder, a Buss co-kneader, or a Farrel mixer. In the extruder or co-kneader the polymer material may be compounded with the mineral filler in an at least partially molten state, i.e. at temperatures above 20° C. Optionally, the extruder can be equipped with a stuffing device.

According to one preferred embodiment, the compounder is an extruder, wherein the temperature of the polymer melt preferably is kept below 205° C., preferably between 160 and 200° C. This is particularly important if the polymer material comprises a polyvinyl chloride.

The term "direct addition technology" as used herein comprises the addition and mixing of a mineral filler material to a polymer material in a direct addition device upstream from a compounding section of a compounder, wherein the direct addition device is in direct connection to the compounding section of the compounder and preferably above said compounding section of the compounder, so that no pneumatic conveying of the resulting mixture to the compounding section is involved. Optionally, feeding of the resulting mixture to the compounding section of the compounder may be carried out by use of a conveying screw, preferably a co-rotating double screw, which may additionally be combined with a stuffing device. The compounding section is a part of the compounder, in which the mineral filler material and the polymer material are actually compounded. If the compounder is a screw extruder, for example, the compounding section would be the screw cylinder including the extruder screw(s) wherein the mineral filler material and the polymer material are compounded.

The addition of the mineral filler material to the polymer material upstream from the compounding section may be carried out using at least one metering unit. According to one embodiment, the mineral filler material is added by the use of a metering unit, preferably a volumetric metering unit, or a gravimetric metering unit.

The compounder may be any device which is suitable for compounding one or more polymer material with one or more additives including the mineral filler material. Said compounder comprises a compounding section, in which the mineral filler material and the polymer material are actually compounded. Such devices are known in the art. A mixing device for direct addition technology can be connected to the compounder, preferably located upstream from the compounding section of the compounder, wherein the mixing device preferably is a mixer and more preferably is a cold-mixer. Suitable mixing devices are known to the skilled person.

According to one embodiment the mineral filler is added to the polymer material in an amount so that the mineral filler content of the resulting composite polymer material is in the range from 150 to 800 phr, preferably in the range from 160 to 700 phr, and more preferably in the range from 170 to 600 phr.

According to another preferred embodiment the mineral filler content of the resulting composite polymer material is in the range from 150 to 800 phr, in the range from 200 to 700 phr, in the range from 250 to 700 phr, in the range from 250 to 600 phr, in the range from 350 to 600 phr or in the range from 400 to 500 phr.

Optionally, further additives known to the skilled person may be added during process step (d). Such additives comprise, without being limited to, mineral fillers, fibres, lubricants, plasticizers, stabilizers (e. g. heat stabilizers or UV stabilizers), co-stabilizers, one packs, processing aids, impact modifiers, flame retardants, antioxidants, biocides, blowing agents, and smoke suppressors. Such additives can be present in amounts up to 100 phr, preferably in an amount from 0.1 to 10 phr.

According to one embodiment, in process step (d) the composite polymer material is formed into a granulate having an average grain size ranging from 2 to 8 mm, preferably from 3 to 7 mm, and more preferably from 4 to 6 mm.

Granulation may be carried out with the compounder used in step (d) of the inventive process. For example, the composite polymer material is formed into a granulate by pressing the compounded mineral filler material and polymer material through a die equipped with a cutting knife, wherein the granule size may be regulated by the applied pressure and/or the cutting speed. However, any other system that is suitable to produce granulates may be used.

According to one embodiment, the composite polymer material obtained by the process steps (a) to (d) of the inventive process is micronized to yield an average grain size of less than 4 mm, preferably less than 3 mm, and most preferably less than 2 mm.

According to another especially preferred embodiment of the present invention, a composite polymer material is formed, wherein a mineral filler material is added to a polymer material in an amount so that the mineral filler content of the resulting composite polymer material is in the range from 60 to 900 phr, wherein said addition of the mineral filler material to the polymer material is performed by use of direct addition technology and wherein the obtained composite polymer material is micronized to yield an average grain size of less than 4 mm, preferably less than 3 mm and most preferably less than 2 mm.

According to yet another especially preferred embodiment of the present invention, a composite polymer material is formed, wherein a mineral filler material is added to a polymer material in an amount so that the mineral filler content of the resulting composite polymer material is in the range from 60 to 900 phr, wherein said addition and mixing of the mineral filler material to the polymer material is performed in a direct addition device upstream from the compounding section of the compounder, wherein the direct addition device is in direct connection to the compounding section of the compounder and preferably above said compounding section of the compounder, so that no pneumatic conveying of the resulting mixture to the compounding section is involved and wherein the obtained composite polymer material is micronized to yield an average grain size of less than 4 mm, preferably less than 3 mm and most preferably less than 2 mm.

The composite polymer material may be micronized by methods known in art for the reduction of the average grain size. Such methods include, without being limited to, milling, bashing and grinding as well as methods involving supercritical fluids.

The Composite Polymer Material

According to one aspect of the present invention, a composite polymer material obtainable by the inventive process is provided. Said composite polymer material may have a defined shape, such as pellets, spheres, pearls, beads, prills, flakes, chips or slugs, a non-defined shape such as, for example, crumbles or it may be a mixture of both defined and non-defined shape composite polymer materials.

According to a further aspect of the present invention, a composite polymer material is provided in the form of grains having an average grain size of less than 4 mm, preferably less than 3 mm and most preferably less than 2 mm.

The inventors surprisingly found that the inventive composite polymer material has several advantageous properties:

The inventive process allows the replacement of polymer material by the mineral filler material. This can lead to a cost reduction in the manufacturing of polymer products.

Furthermore, the increased filler contents may lead to a composite polymer material having a high E-modulus, which in turn may allow reducing the wall thickness of polymer products. Due to an increased higher thermal conductivity of the inventive composite polymer material, cooling time in the provision of polymer products may also be reduced.

By means of the inventive process formation of filler material deposits in the hot-cold mixer as well as segregation problems when pneumatically conveying the dry-blend obtained from the hot-cold mixing to the compounder may be avoided.

Furthermore, the inventive composite polymer material allows adapting the filler content of a polymer product to a predetermined value and moreover allows precise and uniform dosage.

Due to an increased higher thermal conductivity of the inventive composite polymer material cooling time in the provision of polymer products may be reduced.

Moreover problems in connection with dust formation may be avoided when using the composite polymer material as masterbatch for increasing the filler content in polymer products.

According to another embodiment the composite polymer material obtainable according to the inventive process may be used in polymer products. According to a preferred embodiment, the inventive composite polymer material is used in polymer products as a masterbatch.

According to another embodiment a polymer product comprising the inventive composite polymer material is provided.

According to yet another embodiment the polymer product may be a granulate, window profile, pipe, technical profile, wall panel, ceiling panel, cladding panel, wire or cable insulation, film, sheet, fibre, or a non-woven. Such polymer products can be produced by processes comprising an extrusion step, injection moulding, blow moulding, or casting.

EXAMPLES

The scope and interest of the invention may be better understood based on the following examples which are intended to illustrate certain embodiments of the present invention and are non-limitative.

Measurements

K-Value

A measure of the molecular weight of a polymer based on measurements of viscosity of a polymer solution and is defined as follows:

$$\frac{\log(N_S/N_0)}{c} = \frac{75K^2}{1+1.5Kc} + K$$

In general, k-values for a particular polymer may be requested from the polymer producer or may be taken on the packaging or the accompanying technical data sheet.

Particle Size of the Mineral Filler Material

The particle size distribution of the filler material may be measured using a Sedigraph 5120 from the company Micromeritics, USA. The method and the instruments are known to the skilled person and are commonly used to determine grain size of fillers and pigments. The measurement may be carried out in an aqueous solution comprising 0.1 wt.-% $Na_4P_2O_7$. The samples were dispersed using a high speed stirrer and supersonics.

Average Grain Size of the Composite Polymer Material

The average grain size of the composite polymer material is the weight median grain size, i.e. 50 wt.-% of all grains are bigger or smaller than this average grain size. The grain size is determined by sieving according to ISO 3310-1:2000 (E).

General Procedure

Amounts and specifications of components used herein can be taken from the table given for examples 1-4.

The corresponding polymer material may be provided in a hot-mixer. Stabilizer (S), lubricant (L), optional plasticizer (P), optional co-stabilizer (C), an optional processing additive (A) and/or calcium carbonate (F1) may be added and mixed until a temperature of about 120° C. is reached. The mixture then may be cooled down to about 50° C. in a cold-mixer. The mixture may be conveyed to a compounder. By use of direct addition technology further calcium carbonate (F2) as mineral filler material may be added and the resulting mixture may be fed into the compounding section of an extruder, preferably by use of a co-rotating double screw combined with a stuffing device. Optionally, the obtained granulate may be micronized e.g. by using a Pallmann mill to yield an average grain size of less than 2 mm.

Materials

Polymer Material: Polyvinyl Chloride (PVC)

Vestolit® P 1982 K, commercially available from Vestolit GmbH & Co. KG, Germany, k=65.

Polymer Material: Polyvinyl Chloride (PVC)

Vinnolit® E 2059, commercially available from Vinnolit GmbH & Co. KG, Germany, k=59.

Polymer Material: Polyvinyl Chloride (PVC)

INEOS S 5730 Suspenion PVC, commercially available from INEOS Vinyls Deutschland GmbH, Germany, k=57.

Polymer Material: Micronized Recycled Polyvinyl Chloride (R-PVC)

Commercially available from Tönsmeier Kunststoffe, Germany. Average grain size: 0.5 to 1.0 mm.

Co-Stabilizer: Epoxidized Soybean Oil (ESBO)

Viko ex 7170, commercially available from ARKEMA, France.

Plasticizer: 1,2-Cyclohexane Dicarboxylic Acid Diisononyl Ester (DINCH)

Hexamoll® DINCH®, commercially available from BASF SE, Germany.

Filler Material: Hydrocarb 95T-OG

Ground calcium carbonate, commercially available from Omya AG, Switzerland. Particle size $d_{50}$: 0.8 µm; top cut $d_{98}$: 5.0 µm.

Filler Material: Omyalite 50H-OM

Ground calcium carbonate, commercially available from Omya AG, Switzerland. Particle size $d_{50}$: 2.0 µm; top cut $d_{98}$: 10 µm.

Filler Material: Omya BSH®-OM

Ground calcium carbonate, commercially available from Omya AG, Switzerland. Particle size $d_{50}$: 2.4 µm; top cut $d_{98}$: 20 µm.

In the art and in particular in the field of polyvinyl chloride (PVC) processing mixtures comprising stabilizers and lubricants are available, also referred to as one packs. Typical stabilizers may comprise lead stabilizers, calcium-zink stabilizers, organic based stabilizers, calcium organic based stabilizers or tin stabilizers. Typical lubricants may comprise internal lubricants such as fatty alcohols, dicarboxylic acid esters or oxidized polyethylene waxes, external lubricants such as paraffin wax or polyethylene wax or lubricants with internal and external properties such as ester wax or fatty acid esters.

For example, a preferred one pack comprises:

| | |
|---|---|
| 3.5 phr | calcium-zink stabilizer, |
| 0.3 phr | polyethylene wax, |
| 0.25 phr | paraffin wax, and |
| 0.2 phr | oxidized polyethylene wax. |

Examples 1-4

The following illustrative examples may be prepared according to the general procedure given above.

| | 1 | 2 | 3 | 4 |
|---|---|---|---|---|
| polymer material | Vestolit® P 1982 K | Vinnolit® E 2059 | INEOS S 5730 | R-PVC (micronized) |
| S, L | One Pack (3 phr) | One Pack (4 phr) | One Pack (5 phr) | One Pack (2 phr) |
| P | — | — | Hexamoll® DINCH® (4 phr) | — |
| C | — | Vikoflex® 7170 (2 phr) | — | — |
| F1 | Hydrocarb® 95T-OG (20 phr) | — | Omyalite® 50H-OM (10 phr) | — |
| F2 | Hydrocarb® 95T-OG (170 phr) | Omyalite® 90T-OM (200 phr) | Omyalite® 50H-OM (300 phr) | Omya BSH®-OM (400 phr) |
| F1 + F2 | 190 phr | 200 phr | 310 phr | 400 phr |

Examples 5-8

S-PVC (INEOS S 5730, k=57) was dry blended with calcium carbonate (Omyalite® 50H-OM), stabilizer (BAEROPAN R 91800 P/1-CC) and co-stabilizer (ESBO). The blend was charged into a Coperion ZSK 26/60 MC extruder, wherein additional calcium carbonate (Omyalite® 50H-OM) was added by direct addition using an extra metering unit. Redispersion quality of the extrusion product was controlled via profile extrusion and visual inspection. The results of the different trials are listed in the table below.

| | 5 | 6 | 7 | 8 |
|---|---|---|---|---|
| dry blend | INEOS S 5730 Omyalite® 50H-OM (30 phr) BAEROPAN (3.4 phr) — | INEOS S 5730 Omyalite® 50H-OM (30 phr) BAEROPAN (3.4 phr) ESBO (0 phr) | INEOS S 5730 Omyalite® 50H-OM (30 phr) BAEROPAN (3.4 phr) ESBO (0 phr) | INEOS S 5730 Omyalite® 50H-OM (30 phr) BAEROPAN (3.4 phr) ESBO (0 phr) |
| extrude output | 46.7 kg/h | 48.7 kg/h | 49.5 kg/h | 54.5 kg/h |

-continued

|  | 5 | 6 | 7 | 8 |
|---|---|---|---|---|
| CaCO$_3$ via dry blend (clcd.) | 4.5 kg/h | 3.5 kg/h | 2.7 kg/h | 2.4 kg/h |
| CaCO$_3$ via direct addition | 26.5 kg/h | 29.5 kg/h | 34.5 kg/h | 41.5 kg/h |
| total CaCO$_3$ | 31.0 kg/h | 33.0 kg/h | 37.2 kg/h | 43.9 kg/h |
| filler content of the composite | 66.4 wt.-% | 67.8 wt.-% | 75.1 wt.-% | 88.7 wt.-% |
| dispersion quality | excellent | excellent | good | acceptable, some small agglomerates |

The invention claimed is:

1. A process for the production of a composite polymer material, wherein the process comprises the steps of:
   (a) providing a mineral filler material;
   (b) providing a polymer material;
   (c) conveying the mineral filler material of step (a) and the polymer material of step (b) to a compounder;
   (d) forming a composite polymer material in said compounder;
   wherein the mineral filler material of step (a) is added to the polymer material of step (b) in an amount so that the mineral filler content of the resulting composite polymer material is in the range from 60 to 900 phr and wherein the mineral filler material of step (a) is added to the polymer material of step (b) by use of direct addition technology, said technology comprising the addition and mixing of said mineral filler material to said polymer material in a direct addition device in direct connection to the compounding section of the compounder so that no pneumatic conveying of the resulting mixture to the compounding section is involved and wherein said compounder is an extruder.

2. The process according to claim 1, wherein the mineral filler content of the resulting composite polymer material ranges from 150 to 800 phr.

3. The process according to claim 1, wherein the composite polymer material in step (d) is produced in a form of a granulate having an average grain size ranging from 2 to 8 mm.

4. The process according to claim 1, wherein the obtained composite polymer material is micronized to yield an average grain size of less than 4 mm.

5. The process according to claim 1, wherein the polymer material provided in step (b) comprises a mineral filler material.

6. The process according to claim 1, wherein the polymer material provided in step (b) comprises a recycled polymer material.

7. The process according to claim 1, wherein the temperature of the polymer melt is kept below 205° C.

8. The process according to claim 1, wherein the mineral filler material is selected from the group consisting of calcium carbonate, chalk, limestone, marble, dolomite, titanium dioxide, barium sulphate, talc, clay, mica, and any mixture thereof.

9. The process according to claim 1, wherein the mineral filler material is selected from ground dolomite, ground calcium carbonate (GCC), precipitated calcium carbonate (PCC), modified calcium carbonate (MCC), and any mixture thereof.

10. The process according to claim 1, wherein the polymer material comprises a polymer selected from the group consisting of vinyl polymers, vinyl copolymers, acryl polymers, acryl copolymers, chlorinated polyethylenes, and any mixture thereof.

11. The process according to claim 1, wherein the mineral filler material is calcium carbonate and/or dolomite.

* * * * *